United States Patent [19]

Feeser et al.

[11] 4,181,935
[45] Jan. 1, 1980

[54] DATA PROCESSOR WITH IMPROVED MICROPROGRAMMING

[75] Inventors: Walter E. Feeser, San Diego, Calif.; Mark L. C. Gerhold, Raleigh, N.C.

[73] Assignee: Burroughs Corporation, Detroit, Mich.

[21] Appl. No.: 830,157

[22] Filed: Sep. 2, 1977

[51] Int. Cl.² ............... G06F 7/20; G06F 7/28; G05B 13/02

[52] U.S. Cl. .................................................. 364/200

[58] Field of Search ... 364/200 MS File, 900 MS File

[56] References Cited

U.S. PATENT DOCUMENTS

| | | | |
|---|---|---|---|
| 3,593,354 | 7/1971 | Moll | 364/200 |
| 3,740,723 | 6/1973 | Beausoleil et al. | 364/200 |
| 3,766,526 | 10/1973 | Buchanan | 364/200 |
| 3,766,532 | 10/1973 | Liebel, Jr. | 340/172.5 |
| 3,893,084 | 7/1975 | Kotok et al. | 364/200 |
| 3,896,419 | 8/1975 | Vance et al. | 364/200 |
| 3,896,419 | 7/1975 | Lange et al. | 340/172.5 |
| 3,898,624 | 8/1975 | Tobias | 364/200 |
| 3,938,097 | 2/1976 | Niguette | 340/172.5 |

Primary Examiner—Gareth D. Shaw
Assistant Examiner—C. T. Bartz
Attorney, Agent, or Firm—Nathan Cass; Kevin R. Peterson; Edward J. Feeney, Jr.

[57] ABSTRACT

Improved means and methods are described for providing microprogramming in a microprogrammed data processor. A separate, relatively fast access Read/Write microinstruction memory is provided which operates as an index-associative cache memory with respect to the processor main memory in a manner which permits a high "hit" ratio to be obtained for requested microinstructions, while at the same time removing the burden from the programmer of having to be concerned with the loading and/or current contents of the microinstruction memory.

13 Claims, 4 Drawing Figures

DATA PROCESSOR WITH IMPROVED MICROPROGRAMMING

BACKGROUND OF THE INVENTION

The present invention relates to improved means and methods for providing microprogramming in a microprogrammed data processor. More particularly, the present invention is concerned with microprogrammed data processors of the type employing a separate relatively fast access memory for storing microinstructions.

A particular architectural concept that has allowed for more flexibility in computer design and also in computer programming has been the concept of microinstructions. Initially, a microinstruction was thought of as merely a set of control bits employed within a macroinstruction format. Such control bits were employed to provide a corrective measure during the execution of a multiplying instruction or shift instruction and the like. Gradually, as the microprogramming concept enlarged, the macroinstruction specified the particular routine to be performed, such as the addition of two operands. The execution of the macroinstruction was then accomplished through a sequence of executions of microinstructions, each of which specified the particular gates to be set thereby. Since a plurality of macroinstructions could be implemented by a finite set of microinstructions, it was then apparent that these same microinstructions could be stored in a separate storage to be addressed in a particular sequence upon the execution of different macroinstructions. It was further recognized that various sequences of microinstructions could be formulated to carry out the particular operations and separately stored in any memory. Thus, a great variety of sequences of microinstructions could be created to carry out a great variety of routines, and when a given computer system was designed to perform particular routines, only those required sequences of microinstructions that would be stored could be called for to provide for execution of these particular routines.

The concept of microinstructions or microprograms, then, became one of providing sub-instructional sets which were masked or hidden from the programmer, thus, simplifying the writing of particular programs by minimizing the number of individual specific steps that had to be called for by the programmer. Furthermore, the concept of microprogramming allows the computer designer to design a more inexpensive computer system that could provide a great variety of routines to the computer user without the requirement of individual functions being implemented in hand-wired circuitry.

Microprogramming, then, can be broadly viewed as a technique for designing and implementing the control function of a digital computer system as sequences of control signals that are organized on a word basis and stored in a fixed or dynamically changeable control memory. Detailed examples of some known approaches to the design of microprogrammed digital computers can be found in the book by S. S. Husson, "Microprogramming: Principles and Practices", Prentice-Hall, Inc. (1970), the contents of which are to be regarded as incorporated herein by this reference.

Early microprogrammed data processors typically employed a separate relatively fast access read-only microinstruction memory for storing microinstructions, such as exemplified by the embodiments disclosed in U.S. Pat. Nos. 3,325,788 and 3,518,632.

As the computer art progressed, a need arose for greater numbers and types of stored microinstructions to be available from the microinstruction memory which led to the provision of Read/Write microinstruction memories in which selected microinstructions could be provided from the processor main memory under program control so as to give the programmer the ability to modify the microinstruction content in the microinstruction memory. Examples of such Read/Write microinstruction memories will be found in U.S. Pat. Nos. 3,478,322; 3,792,441 and 3,739,352. In such systems, the programmer would, of course, attempt to design his program so that the majority of required microinstructions would be present in the relatively fast access Read/Write microinstruction memory, thereby avoiding having to access the requested microinstruction from the main memory or other auxiliary storage which has a significantly slower access time. The determination that a requested microinstruction is present in the microinstruction memory during a microinstruction fetch operation is typically referred to as a "hit", while the absence of the requested microinstruction is typically referred to as a "miss". Thus, the greater the "hit" ratio of requested microinstructions, the faster the runtime of a program. It is thus of considerable significance in a microprogrammed data processor to be able to increase the "hit" ratio of requested microinstructions, particularly if this can be accomplished without deleteriously impacting on the system hardware or software or increasing the burdens on the programmer.

SUMMARY OF THE PRESENT INVENTION

Accordingly, it is a broad object of the present invention to provide improved means and methods for increasing the speed of accessing microinstructions in a microprogrammed data processor.

A more specific object of the invention is to provide improved means and methods for providing microprogramming in a microprogrammed data processor employing a separate microinstruction memory so as to remove the burden from the programmer of having to be concerned with the contents of the microinstruction memory.

A further object of the present invention is to provide an increased "hit" ratio in a relatively simple and economical manner and without burdening the programmer.

The above objects are accomplished in an exemplary embodiment of the invention by providing the microinstruction memory in a manner so that it operates as a cache memory with respect to the processor main memory using an index-associative addressing technique which permits a high "hit" ratio to be obtained for requested microinstructions with a minimum of additionally required hardware and software. An additional feature of this embodiment resides in the provision of improved means for determining the validity of a selected microinstruction in the microinstruction memory so as to expedite clearing and updating of the microinstruction memory.

The specific nature of the invention as well as other objects, features, advantages and uses thereof will become readily apparent from the following detailed description and the accompanying drawings.

DETAILED DESCRIPTION

Introduction

Like characters and numerals refer to like elements throughout the figures of the drawings.

For the purpose of illustrating how the present invention may be implemented and its advantages realized, this detailed description will describe how the present invention may be implemented in a microprogrammed data processor of the type disclosed in the commonly assigned U.S. Pat. No. 3,792,441, which disclosed embodiment is generally similar to B 1700 computer systems commercially available from the Burroughs Corporation. However, it is to be understood that the present invention may also be used to advantage with other types of computer systems. Thus, the present invention is not to be considered as limited to the particular implementation described herein.

Summary Description on U.S. Pat. No. 3,739,552 (FIG. 1)

In order to provide background for the present invention, the embodiment disclosed in the aforementioned U.S. Pat. No. 3,739,352 will first be generally described with reference to FIG. 1 which is the same as FIG. 1 of this patent. Further details are obtainable by reference to the patent itself whose full disclosure is to be considered as incorporated herein.

Figure 1:
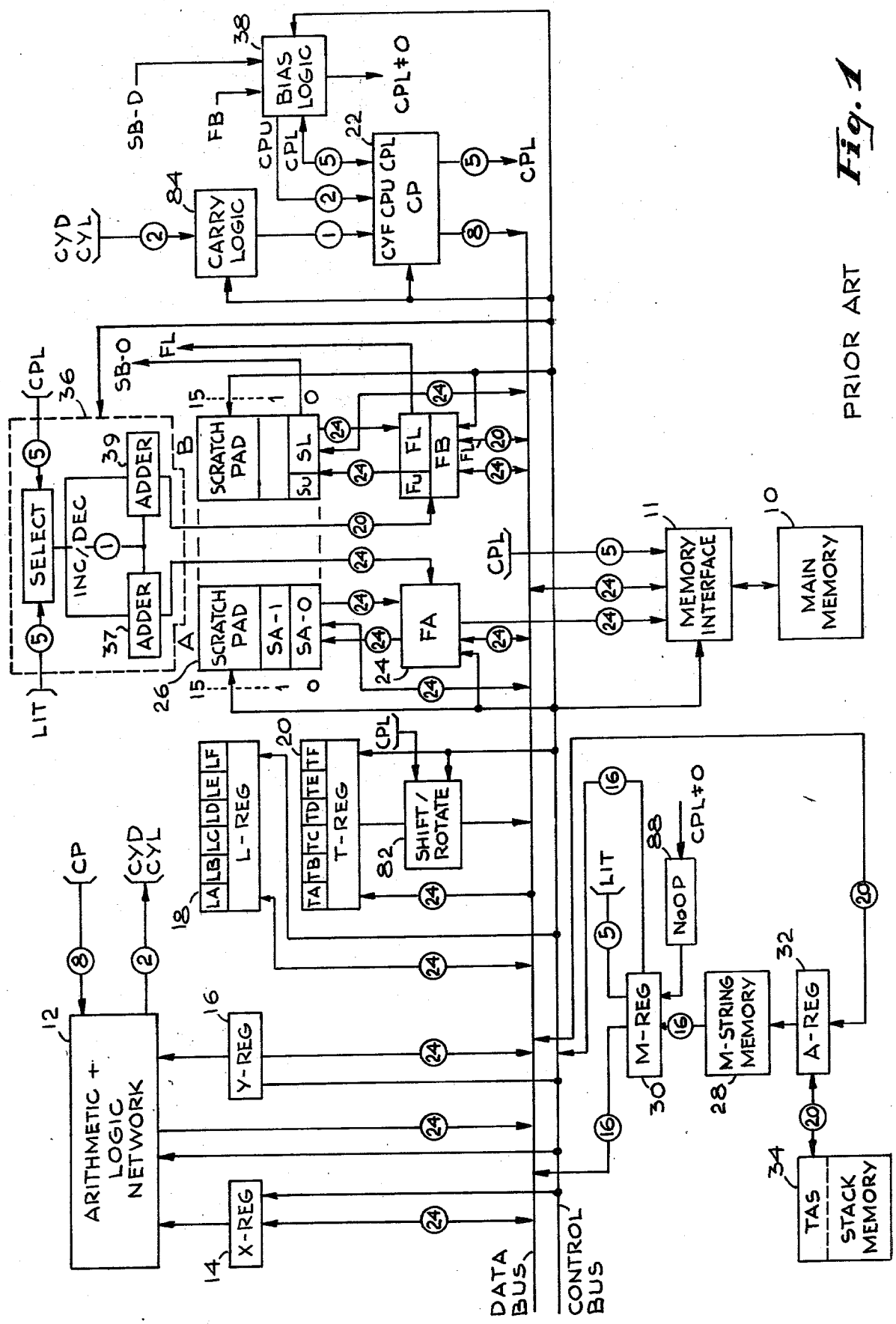
FIG. 1 is a block diagram of the microprogrammed data processor disclosed in U.S. Pat. No. 3,739,352.

Referring to FIG. 1 there is shown a block diagram of the processor disclosed in U.S. Pat. No. 3,739,352. The processor operates by executing microoperators which provide transfer between various registers to be described and with a storage unit. The storage unit comprises a main memory 10 and memory interface control 11 which controls transfers of data between the main memory and a data transfer bus. The data bus has, for example, 24 parallel conductive paths providing parallel transfer of up to 24 bits between the main memory 10, an arithmetic and logic network 12, and a plurality of registers. These registers include an X-register 14 and a Y-register 16 which provide storage for the two operands applied to two operand inputs of the arithmetic and logic network 12. Three operational registers are provided, an L-register 18, a T-register 20, and a CP-register 22. The L and T registers are general purpose registers which, together with the X and Y registers, serve as either the source or sink for Read/Write operations with the main memory 10. Both the L-register and T-register are addressable as full 24-bit registers or as six 4-bit registers designated by the letters A through F.

The CP-register 22, for the purpose of the present description may be considered as only 8-bits in length and is connected to only the 8 least significant bit lines of the data bus. The CP-register functionally is divided into three sections designated CPL, CPU and CYF which in conjunction with bias logic 38 and carry logic 84 are used in providing variable word width processor control.

The main memory 10 is a field free memory, such as described in detail in the commonly assigned U.S. Pat. No. 3,781,812. Addressing is by field, in which the bit boundary marking the start of the field and the length of the field are specified by the address. A maximum of 24-bits is transferred in or out of memory in parallel during each memory access cycle.

Figure 2:
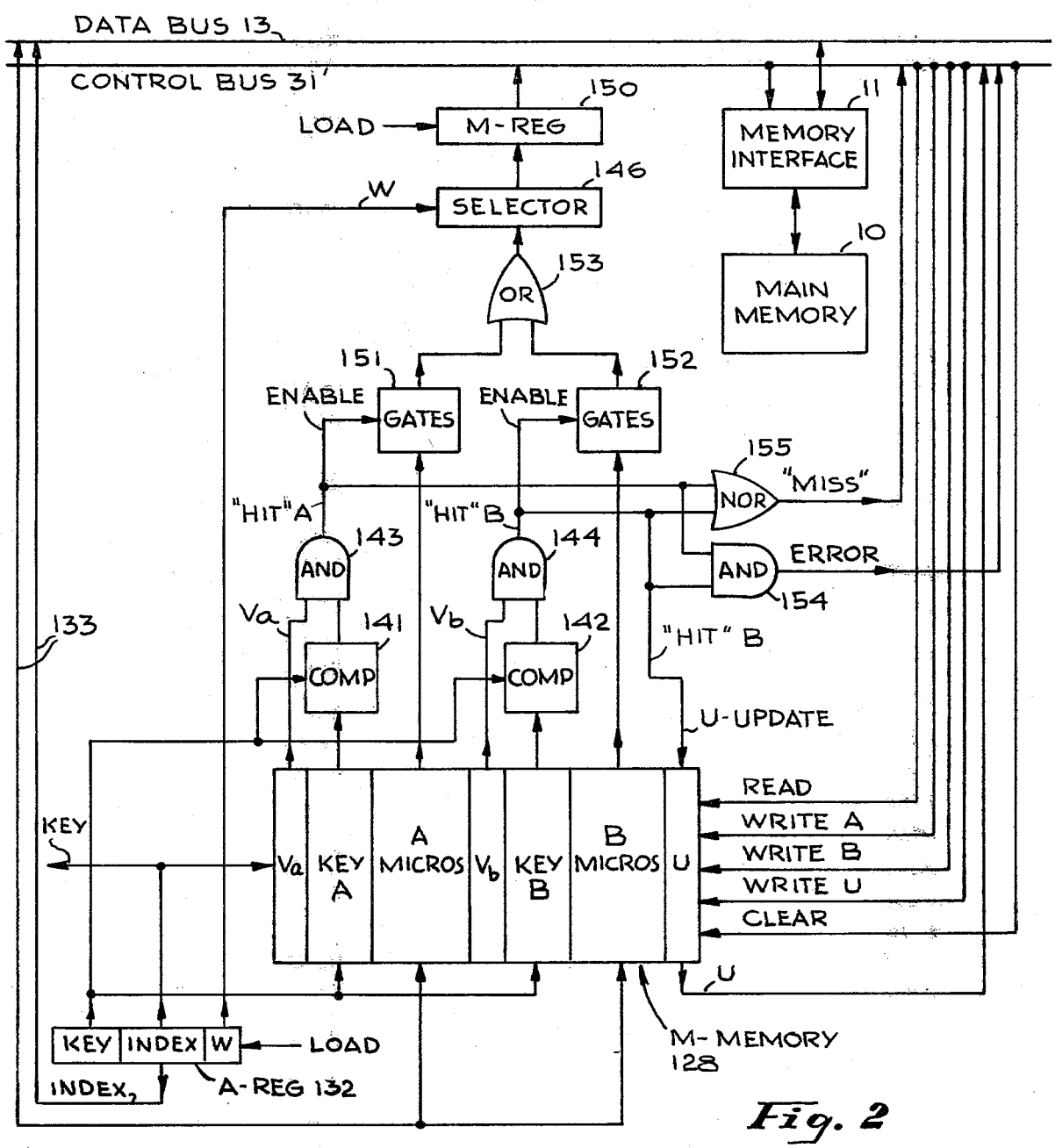
FIG. 2 is a block diagram illustrating how the improved microinstruction fetching means and methods of the present invention may be incorporated in the system of FIG. 1.

The processor also includes a field definition section for storing descriptors defining fields in the main memory 10. The field definition section includes an F-register 24 which is a 48-bit register. The F-register is divided into two 24-bit sections FA and FB. The FB section in turn has two sections, an FU section which is 4-bits and an FL section which is 20-bits. As shown in FIG. 2, the FA section, when a data descriptor is present in the F-register 24, contains the bit boundary address and the FL section stores the field length of a field in memory (up to $2^{20}$ bits in length). The FU section is used to specify the unit size, e.g., binary (1 bit unit), binary coded decimal (4 bit unit), or an 8-bit code.

Associated with the F-register 24 is a scratchpad memory 26 which may, for example, store up to 16 48-bit words. The 16 word locations in the scratchpad memory are designated 0 through 15, respectively. The scratchpad memory is functionally divided into two sections, Section A and Section B, each 24-bits in width. The two sections of the scratchpad memory as well as the sections of the F-register 24 are separately addressable for transfers over the data bus. In addition all 48-bits of the F-register can be loaded from any of the 16 locations in the scratchpad memory, can be stored in any of the locations of the scratchpad memory, or can be exchanged with any location in the scratchpad memory.

Control of the processor is by means of strings of microoperators which are stored in an M-string memory 28. The microoperators in the string are transferred out of the M-string memory 28 one at a time into an M-register 30. The microoperators may typically be 16-bits in length, the 16-bits in the M-register being applied to a control bus for distribution to control logic distributed throughout the processor and associated with the various registers, the arithmetic and logic network 12, the scratchpad memory 26, and the memory interface control 11. The control bus has 16 conductors for receiving the 16 control bits in parallel. The M-string memory 28 is addressed by an A-register 32. The A-register 22 contains the number of bits necessary to address all the cells in the M-string memory 28. Twenty bits are shown by way of example. Normally the A-register 32 is advanced by one each clock pulse, causing the next microoperator in sequence to be transferred from the memory 28 into the register 30. The same clock pulse which causes the new microoperator to be transferred into the M-register 30 also causes the execution of the current microoperator in the M-register. The A-register 32 can be set to any new address from the data bus to permit branching to a different string of microoperators in the M-string memory 28. A stack memory 34 is preferably provided which operates as a puch-down stack for storing return addresses to permit return to a particular microoperator string following the calling of a subroutine of microoperators.

DESCRIPTION OF THE PRESENT INVENTION (FIGS. 2–4)

The present invention will now be described with reference to FIGS. 2–4 by illustrating how it may be applied to a microprogrammed data processor of the type disclosed in the aforementioned U.S. Pat. No. 3,739,352 summarized above.

Accordingly, with the aforementioned U.S. Pat. No. 3,739,352 as background, attention is now directed to FIG. 2 which illustrates how the present invention may advantageously be implemented in a system of the type illustrated in FIG. 1. It is to be understood that, for greater clarity, FIG. 2 illustrates only those elements and connections therebetween of the system of FIG. 1 which are specifically involved in the description of the present invention.

As illustrated in FIG. 2, an M-memory 128 is provided along with an A-register 132 for addressing purposes. FIG. 3 shows how, for example, 256 data items may typically be stored in M-memory 128. Each data item typically comprises a pair of A and B blocks and a use bit U. An item of data is read from M-memory 128 in response to an Index field provided by A-register 132. It will be understood that for 256 like items of data, such as illustrated in FIG. 3, the Index field provided by A-register 132 will contain 8-bits so as to permit addressing any selected one of these stored M-memory data items.

Figure 3:
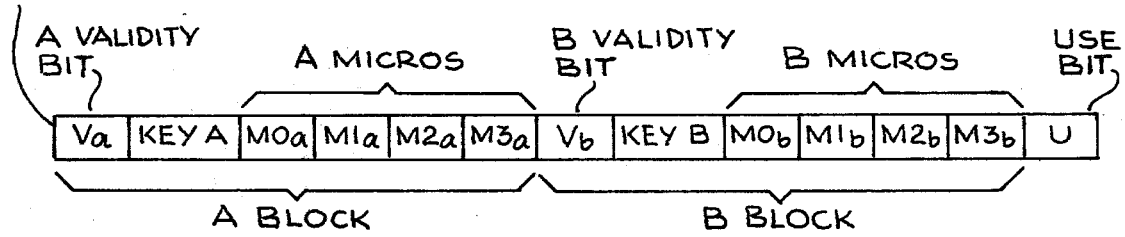
FIG. 3 illustrates a typical data item stored in the microinstruction M-memory of FIG. 2.

As shown in FIG. 3, each item of data comprises: (1) an A-block containing an A-key, four micros $M0_a$, $M1_a$, $M2_a$ and $M3_a$ (a micro being a microinstruction), and a validity bit $V_a$; (2) a similar B-block containing a B-key, four micros $M0_b$, $M1_b$, $M2_b$ and $M3_b$, validity bit $V_b$; and (3) a use bit U indicating a priority between blocks A or B based on which block has been least recently used. Other bases for priority could also be provided. Each of the validity bits $V_a$ and $V_b$ serves to indicate whether its respective block contains valid micros.

Figure 4:
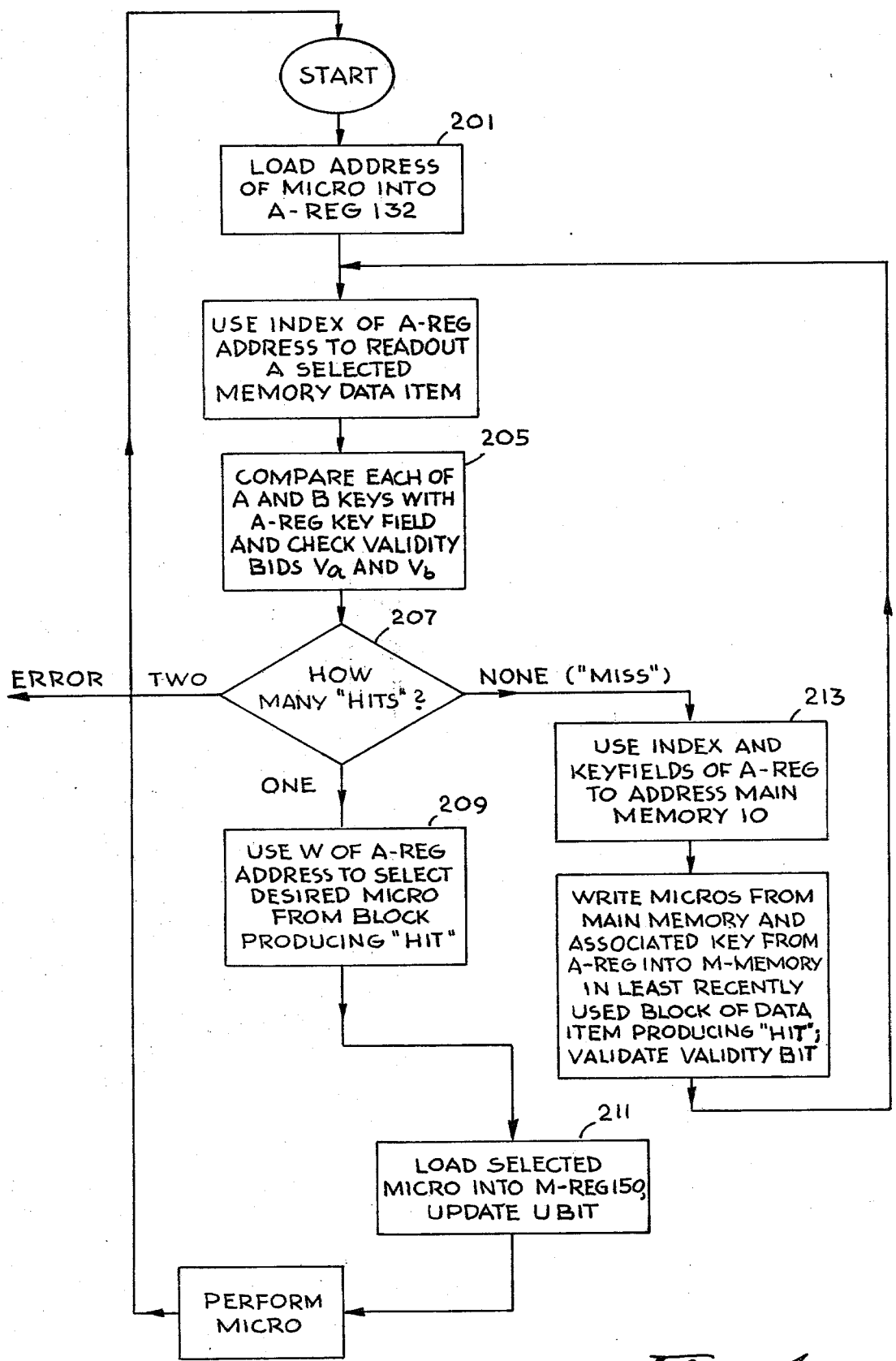
FIG. 4 is a flow chart illustrating typical steps involved in performing microinstruction fetching in accordance with the present invention using the implementation of FIG. 2.

The construction and operation of the implementation of the invention illustrated in FIG. 2 will now be further described in conjunction with the flow chart of FIG. 4 which illustrates typical steps involved in a microinstruction fetching operation in accordance with the invention. It will be understood that the fetching of a desired microinstruction during operation of the processor includes an initial step (indicated at 201 in FIG. 4) of loading an address corresponding to the desired microinstruction into A-register 132. As indicated in FIG. 2, the microinstruction address in A-register 132 includes an Index field, a Micro word field and a Key field. The Index field is used during microinstruction fetching to address a data item in M-memory 128 (step 203 in FIG. 4), resulting in the reading out from M-memory 128 of blocks A and B and the associated U bit of the addressed data item.

As indicated by step 205 in the flow chart of FIG. 4, each of the A and B keys read from M-memory 128 are applied to respective comparators 141 and 142 in FIG. 2 where they are compared with the Key field in A-register 132. The results of these comparisons and ANDed in respective AND gates 143 and 144 with respective validity bits $V_a$ and $V_b$ which are "1" or true if their respective micros are valid. The resulting outputs of these AND gates 143 and 144 are designated "hit" A and hit "B", respectively. The three possible results of these comparisons are indicated by decision step 207 in FIG. 4. If one and only one "hit" value is "1" or true, then a "hit" occurs on the corresponding block, indicating that it is this block which is being called for by the address in A-register 132. As indicated by step 209 of FIG. 4, when such a valid "hit" occurs, the particular micro desired is selected from those in the block which produced the "hit" by applying the word field W from A-register 132 to a selector 146. Gates 151 and 152, which are enabled by "hit" A and "hit" B, respectively, serve to route the block of micros for which a "hit" was obtained to selector 146. The resulting output from selector 146 is the desired microinstruction and is loaded into M-register 150 (step 211 in FIG. 4). The system then performs the thus fetched micro which has been loaded into M-register 150 in a manner as described, for example, in the system of the aforementioned U.S. Pat. No. 3,739,352 shown in FIG. 1. In addition, when a valid hit occurs, the U bit of the addressed data item from M-memory 128 is updated, a "0" value indicating that block A was least recently used and a "1" value indicating that block B was least recently used. Thus, as indicated in FIG. 6, the U bit is written during step 211 (FIG. 4) with the "hit" B signal. As a result, if the "hit" was on block A, the U bit will be written as a "0", and if on block B, the U bit will be set to "1".

Returning to decision step 207 in FIG. 4, if both of the signals "hit A" and "hit B" are true in the decision step 207 of FIG. 4, an AND gate 154 in FIG. 2 to which these signals are applied will become true to indicate the occurrence of an error. This error signal is sent to the processor control, which logs and handles the error in a conventional manner.

The final possibility indicated by step 207 occurs when neither "hit" signal is true, which indicates that the microinstruction pointed to by A-register 132 is not to be found in the M-memory 128. In such a case, a NOR gate 155 in FIG. 2 to which the "hit" signals are applied provides a "miss" signal which is used to initiate the operations indicated in step 213 of FIG. 4. As indicated in step 213, the Key and Index fields of A-register 132 are applied via lines 133 and data bus 13 to memory interface 11, in order to obtain a block of microinstructions containing the desired micro from main memory 10. This may be accomplished, for example, in the manner disclosed in the aforementioned U.S. Pat. No. 3,792,441.

As illustrated in FIG. 2 and in step 217 of FIG. 4, the accessed block of microinstructions from main memory 10 is applied to M-memory 128 via lines 135 for writing in the location addressed by the Index field of A-register 132 and in the block that is indicated as being least recently used by the current output of the U bit at this index. In addition, the Key field of this block is written at this time using the Key field of A-register 132, and the validity bit is written as a "1". Since the desired microinstruction is now in M-memory 128, the system may now obtain it from M-memory 128 as previously described for a "hit" situation. Accordingly, the desired microinstruction is again requested resulting in the repeating of steps 203, 205 and 207 in FIG. 4. At the decision step 207, a valid "hit" is now guaranteed since the validity and key fields of the least recently used block of M-memory 128 were just written with a "1" and the Key field of the A-register 132, respectively. Thus, as previously described in connection with steps 209 and 211, M-register 130 will be loaded with the microinstruction and the U bit will be updated, following which the micro thus loaded into M-register 150 is then performed.

A validity bit clear operation is additionally provided for M-memory 128 in FIG. 2 in response to a clear signal which clears all the stored validity bits in both block A and block B portions of M-memory 128, thus invalidating the entire memory. This validity bit clear operation is used when new microinstructions in main memory 10 are to be written over old microinstructions, such as when the processor is initially started. The need for special programming for loading M-memory 128 when a new program is initiated will thus be eliminated, since microinstructions required for the new program will automatically be obtained from main memory 10 when each such desired microinstruction is requested during initial running of the program. Also, this clear operation sets all U bits to "0", thereby giving each A block initial priority.

It is to be understood that the present invention is subject to a wide variety of modifications and variations in construction, arrangement and use without departing from the scope of the invention. For example, it is to be understood that the specific embodiment of the invention described herein may be modified so that a desired micro can be directly selected from a block of micros obtained from the main memory as a result of a "miss" without having to repeat the request in order to obtain the newly written micro from M-memory 128 as illustrated in FIG. 4. Many other possible types of modifications are also possible.

Accordingly, the present invention is to be considered as including all possible modifications and variations coming within the scope of the invention as defined by the appended claims.

What is claimed is:

1. In a microprogrammed data processor in which data is processed using macroinstructions, each of which is in turn implemented by the execution of one or more mocroinstructions, the improvement comprising:

an addressable main memory for storing a plurality of macroinstructions and a plurality of microinstructions for implementing said macroinstructions;

an addressable dynamically changable microinstruction memory having a fast access time and a smaller storage capacity relative to said main memory, said microinstruction memory providing for storing a plurality of microinstruction data items at individually addressable storage locations, each microinstruction data item containing one or more microinstructions and an associated key;

microinstruction output means for receiving a microinstruction accessed from said microinstruction memory;

microinstruction addressing means for receiving from said processor in response to a macroinstruction being executed a microinstruction address indicative of a requested microinstruction which it is desired be applied to said microinstruction output means for use in executing said macroinstruction, said microinstruction address including an index field identifying a selected microinstruction data item storage location in said microinstruction memory, said microinstruction address also including a key field;

means responsive to the index field a microinstruction address received by said microinstruction addressing means for reading out a selected data item from a selected microinstruction data item location of said microinstruction memory;

comparing means for comparing the key field of a microinstruction address in said microinstruction addressing means with each key contained in a selected microinstruction data item read out from said microinstruction memory in response to the infex field, of the microinstruction address in said microinstruction addressing means, said comparing means providing a "hit" signal in response to a successful comparison between said key field and only one key of a selected microinstruction data item read out from said microinstruction memory and said comparing means providing a "miss" signal when no successful comparison is obtained between said key field and any key of a selected microinstruction data item read from said microinstruction memory;

"hit" responsive means responsive to a "hit" signal produced by said comparing means for causing the requested microinstruction in the microinstruction data item whose selection produced the "hit" signal to be applied to said microinstruction output means;

"miss" responsive means responsive to a "miss" signal produced by said comparing means for employing the key field and index field of a microinstruction address in said microinstruction addressing means for which the "miss" signal was produced for obtaining from said main memory the requested microinstruction and for causing this requested microinstruction to be applied to said microinstruction output means, said "miss" responsive means also being operative in response to a "miss" signal to write the requested microinstruction and its associated key into the microinstruction data item storage location of said microinstruction memory for which a "miss" was produced; and means for executing a microinstruction received by said microinstruction output means and for deriving a next microinstruction address for application to said microinstruction addressing means.

2. The invention in accordance with claim 1, wherein each microinstruction data item contains at least first and second blocks, each block containing an associated key and one or more microinstruction.

3. The invention in accordance with claim 2, wherein each microinstruction data item includes a priority indication indicating a higher priority for one of the blocks contained in each microinstruction data item, and wherein said "miss" responsive means includes means responsive to the priority indication contained in a data item read out from said microinstruction memory which produces a "miss" for causing a requested microinstruction obtained from said main memory and the associated key to be written in the higher priority block of the microinstruction data item storage location for which the "miss" was produced.

4. The invention in accordance with claim 3, wherein each block contains a plurality of microinstructions, wherein the microinstruction address received by said microinstruction addressing means includes a word field identifying which one of the plurality of microinstructions contained in a block is the one requested, and wherein means are provided responsive to said word field for selecting the requested microinstruction for application to said microinstruction output means from the plurality of microinstructions contained in the block whose key corresponds to the key field received by said microinstruction addressing means.

5. The invention in accordance with claim 4, wherein said "miss" responsive means is operative to substitute all of the microinstructions in the higher priority block of the microinstruction data item storage location for which a "miss" is produced with microinstructions obtained from said main memory.

6. The invention in accordance with claim 3, wherein said priority indication has a value based on which block of a microinstruction data item has most recently been used, and wherein said comparing means is additionally operative to update said priority indication in response to which associated key of a block of an accessed microinstruction data item produces a "hit".

7. The invention in accordance with claim 6, wherein said priority indication comprises a single use bit contained in each block, and wherein said comparing means is operative to update said use bit in response to which block produces a "hit".

8. The invention in accordance with claim 3, wherein each block additionally includes a validity indication indicating whether the contents of the block are valid, wherein said comparing means is operative to provide said "hit" signal only if the validity indication of a block whose associated key produces a "hit" indicates that the contents of the block are valid, and wherein said "miss" responsive means operates to set the validity indication of the block receiving the requested microinstruction from said main memory to a value indicating validity of the contents of that block.

9. The invention in accordance with claim 5, wherein setting means are additionally provided for causing the validity indications in said microinstruction memory to indicate that the contents of their responsive blocks are invalid.

10. The invention in accordance with claim 9, wherein the validity indication of each block of said microinstruction memory is provided by a single bit in the block, and wherein said setting means operates to clear all of the validity bits to a single binary value.

11. The invention in accordance with claim 9, wherein said setting means also includes mens for setting the priority indication of each data item of said microinstruction memory to an initial value.

12. The invention in accordance with claim 9, wherein said setting means produces said invalidity indications when a new set of microinstructions are to be written over the microinstructions contained in said microinstruction memory.

13. The invention in accordance with claim 2 wherein said comparing means includes means for providing an error indication when the associated key of more than one block of an accessed microinstruction data item produces a successful comparison between its associated key and said key field received by said microinstruction addressing means.

* * * * *

UNITED STATES PATENT AND TRADEMARK OFFICE
CERTIFICATE OF CORRECTION

PATENT NO. : 4,181,935
DATED : January 1, 1980
INVENTOR(S) : W.E. Feeser and M.L.C. Gerhold It is certified that error appears in the above-identified patent and that said Letters Patent are hereby corrected as shown below:

Col. 4, line 52, change "22" to --32--;
       line 66, change "puch-down" to --push-down--.
Col. 5, line 34, after "$M3_b$," insert --and a--;
       line 61, change "and" to --are--.
Col. 7, line 39, change "mocroinstructions," to --microinstructions,--;
       line 65, after "field" insert --of--.
Col. 8, line 8, change "infex" to --index--.
Col. 10, line 14, change "mens" to --means--.

Signed and Sealed this

Twenty-fifth Day of March 1980

[SEAL]

Attest:

SIDNEY A. DIAMOND

*Attesting Officer*     *Commissioner of Patents and Trademarks*